(No Model.)
J. MONJOU.
DEVICE FOR MEASURING AND FITTING DRESSES.
No. 283,638. Patented Aug. 21, 1883.
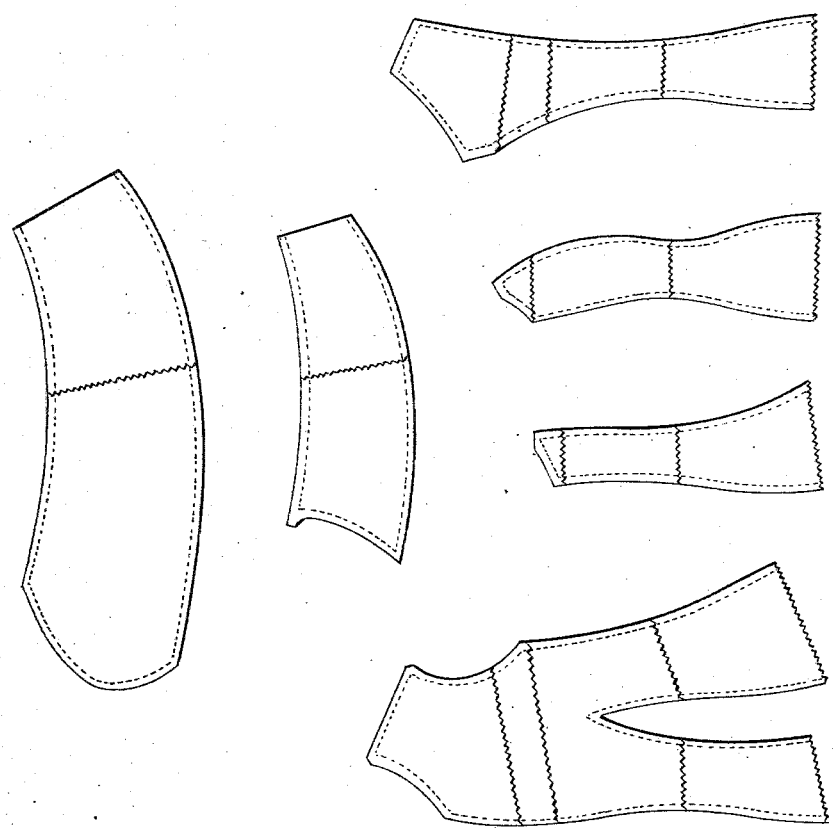
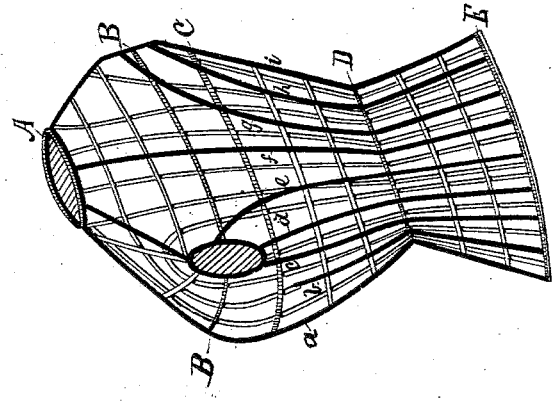

UNITED STATES PATENT OFFICE.

JEAN MONJOU, OF PARIS, FRANCE.

DEVICE FOR MEASURING AND FITTING DRESSES.

SPECIFICATION forming part of Letters Patent No. 283,638, dated August 21, 1883.

Application filed June 2, 1883. (No model.)

*To all whom it may concern:*

Be it known that I, JEAN MONJOU, of the city of Paris, France, have invented an Improved Method of and Means for Facilitating Measurement for Tailoring, Dress-Making, or Similar Purposes, of which the following is a full, clear, and exact description.

This invention relates to a device designed to act as a guide in taking measurements for dresses or garments or for patterns for the same.

By employing this device any person, even those who do not know anything about sewing or dress-making, will be able to take measurements with precision, and exactly where they should be taken, so that the dress cut and made according to the said measurements will closely fit the person for whom it is intended.

The said invention consists, essentially, in making a jacket or bodice formed of elastic bands, so as to yield equally in all directions, and so as to adapt itself perfectly to the figure of the person who is being measured. This bodice must be made in all cases smaller than the person for whom it is intended, as will be easily understood.

The parts which are to be measured are shown in my device by various elastic bands.

In order that the said invention may be properly understood, I have shown a specimen thereof in the accompanying drawings.

Figure 1 shows the jacket or bodice, supposed to be applied on a bust. Fig. 2 shows the different parts of a pattern, with the lines which are to be followed in the measurements, these parts being cut according to my process and used in connection with my device.

The five horizontal bands shown in shaded lines are arranged so as to apply exactly to the various points which indicate the heights at which it is necessary to measure the various widths required. For example: Starting at the top, the shaded band A serves to measure the size of the neck. The shaded band B serves to measure the width of the back between the sleeves, and in front the breadth of the chest. The band C serves to measure the total size round the bust, being taken under the arms and round the most prominent part of the chest. The band D serves to measure round the waist. The band E gives the total width between the hips. These different measurements are shown in dotted lines on the different parts of the pattern which are shown in Fig. 2 of the drawing.

The bands shown in thick black lines *a b c*, and so on, indicate the seams, and assist in finding the other measurements required for heights, such as the height from the armpit, the waist, shoulders, neck, and other parts.

This device, instead of being made of elastic bands, joined as above described with reference to the accompanying drawings, might be made of any fabric equally elastic, and upon which lines might be drawn or other indications made corresponding to the various bands, as above described, and which would answer the same purpose.

Although the device as above described, and shown on the accompanying drawings, is supposed to apply to the measurement of ladies' dresses, it is evident that the said invention might be equally applied to gentlemen's garments, and be used by tailors as well as by dress-makers.

I claim—

1. An elastic jacket or bodice for facilitating taking measurements for dresses or other garments, having the several measurements from the neck to the hips marked thereon, substantially as herein described.

2. A jacket or bodice for facilitating taking measurements for dresses and other garments, formed of the elastic measuring-bands A B C D E, substantially as shown and described.

The foregoing specification of my improved method of and means for facilitating measurement for tailoring, dress-making, or similar purposes signed by me this 15th day of May, 1883.

JEAN MONJOU.

Witnesses:
 ROBT. M. HOOPER,
 ALBERT MOREAUS.